US008009943B2

(12) United States Patent
Bratkovski et al.

(10) Patent No.: US 8,009,943 B2
(45) Date of Patent: Aug. 30, 2011

(54) MAGNETICALLY ACTIVATED PHOTONIC SWITCHES AND SWITCH FABRICS EMPLOYING THE SAME

(75) Inventors: Alexandre Bratkovski, Mountain View, CA (US); Michael Tan, Menlo Park, CA (US); Raymond Beausoleil, Redmond, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/254,415

(22) Filed: Oct. 20, 2008

(65) Prior Publication Data

US 2009/0110348 A1    Apr. 30, 2009

Related U.S. Application Data

(60) Provisional application No. 61/001,471, filed on Oct. 31, 2007.

(51) Int. Cl.
*G02B 6/26* (2006.01)
*G02B 6/42* (2006.01)

(52) U.S. Cl. .............................. 385/16; 385/17; 385/50

(58) Field of Classification Search ............... 385/16–17
See application file for complete search history.

(56) References Cited

U.S. PATENT DOCUMENTS

| 6,411,752 | B1 * | 6/2002 | Little et al. .................. 385/17 |
| 6,636,668 | B1 * | 10/2003 | Al-hemyari et al. ............ 385/40 |
| 6,661,950 | B1 * | 12/2003 | Strecker ..................... 385/30 |
| 6,909,824 | B1 * | 6/2005 | Messica et al. ............... 385/30 |
| 7,120,338 | B2 * | 10/2006 | Gunn, III .................... 385/50 |
| 7,200,299 | B1 * | 4/2007 | Earnshaw .................... 385/17 |
| 7,379,634 | B2 * | 5/2008 | Hyde et al. .................. 385/16 |
| 7,447,387 | B2 * | 11/2008 | Shih et al. .................... 385/2 |
| 7,664,355 | B2 * | 2/2010 | Covey ...................... 385/122 |
| 2004/0091392 | A1 * | 5/2004 | McBride et al. .............. 422/57 |
| 2004/0114867 | A1 * | 6/2004 | Nielsen et al. ................ 385/40 |
| 2004/0150268 | A1 * | 8/2004 | Garito et al. ................. 310/12 |
| 2008/0267557 | A1 * | 10/2008 | Wang et al. .................. 385/16 |

FOREIGN PATENT DOCUMENTS

JP    64001307 A   *  1/1989
JP    64001313 A   *  1/1989

* cited by examiner

*Primary Examiner* — Uyen-Chau N Le
*Assistant Examiner* — Chris H Chu

(57) ABSTRACT

Various embodiments of the present invention are directed to photonic switches and switch fabrics employing the photonic switches. In one embodiment of the present invention, a photonic switch comprises a first waveguide disposed on a surface of a substrate in proximity to an opening in the substrate, and a second waveguide crossing the first waveguide and positioned in proximity to the opening in the substrate. The photonic switch includes a tunable microring resonator disposed on the surface of the substrate adjacent to the first waveguide and the second waveguide and configured with an opening aligned with the opening in the substrate. The photonic switch also includes a wire having a first end and a second end and configured to pass through the opening in the microring and the opening in the substrate.

20 Claims, 15 Drawing Sheets

MAGNETICALLY ACTIVATED PHOTONIC SWITCHES AND SWITCH FABRICS EMPLOYING THE SAME

CROSS-REFERENCE TO RELATED APPLICATION

The present application claims priority from provisional application Ser. No. 61/001,471, filed Oct. 31, 2007, the contents of which are incorporated herein by reference in their entirety.

TECHNICAL FIELD

Embodiments of the present invention are directed to photonic switches and photonic-switch-based switch fabrics.

BACKGROUND

Switch fabrics are typically employed for "raw" data switching from input ports to output ports of various kinds of devices, including processors, memory, circuit boards, servers, storage servers, external network connections or any other data processing, storing, or transmitting device. However, switch fabrics can often be a data processing bottleneck for many different kinds of computing environments. A typical switch fabric, for example, can limit the scope of a computing environment's ability to handle the ever increasing data processing and transmission needs of many applications, because many switch fabrics are fabricated to accommodate only the "port-rate of the day" and the "port-count of the day" and are not fabricated to accommodate larger bandwidths that may be needed to effectively accommodate future applications. In particular, the amount and frequency with which data is exchanged between certain devices can be larger for some devices than for others, and the use of low-latency, metal-signal lines employed by most switch fabrics also have limited bandwidths. As a result, the amount of data that can be transmitted between devices may not be well matched to the data transfer needs of the devices employed by an application at each point in time, which often results in data processing delays. In addition, the use of signal lines necessitates considerable power consumption in order to transmit electrical signals between devices.

A number of the issues associated with electrical signals transmitted via signal lines can be significantly reduced by encoding the same information in electromagnetic, radiation ("EMR") that is transmitted via waveguides. First, the data transmission rate can be increased significantly due to the much larger bandwidth provided by waveguides. Second, power consumption per transmitted bit is lower for EMR transmitted via waveguides than for transmitting the same data in electrical signals via signal lines. Third, degradation or loss per unit length is much less for EMR transmitted via waveguides than for electrical signals transmitted via signal lines. Physicists and engineers have recognized a need for fast switching devices that can accommodate data encoded EMR as a medium for transmitting massive amounts of data between various kinds of data processing, storing, or transmitting devices.

SUMMARY

Various embodiments of the present invention are directed to photonic switches and switch fabrics employing the photonic switches. In one embodiment of the present invention, a photonic switch comprises a first waveguide disposed on a surface of a substrate in proximity to an opening in the substrate, and a second waveguide crossing the first waveguide and positioned in proximity to the opening in the substrate. The photonic switch includes a tunable microring resonator disposed on the surface of the substrate adjacent to the first waveguide and the second waveguide and configured with an opening aligned with the opening in the substrate. The photonic switch also includes a wire having a first end and a second end and configured to pass through the opening in the microring and the opening in the substrate.

DETAILED DESCRIPTION

Figure 1A:
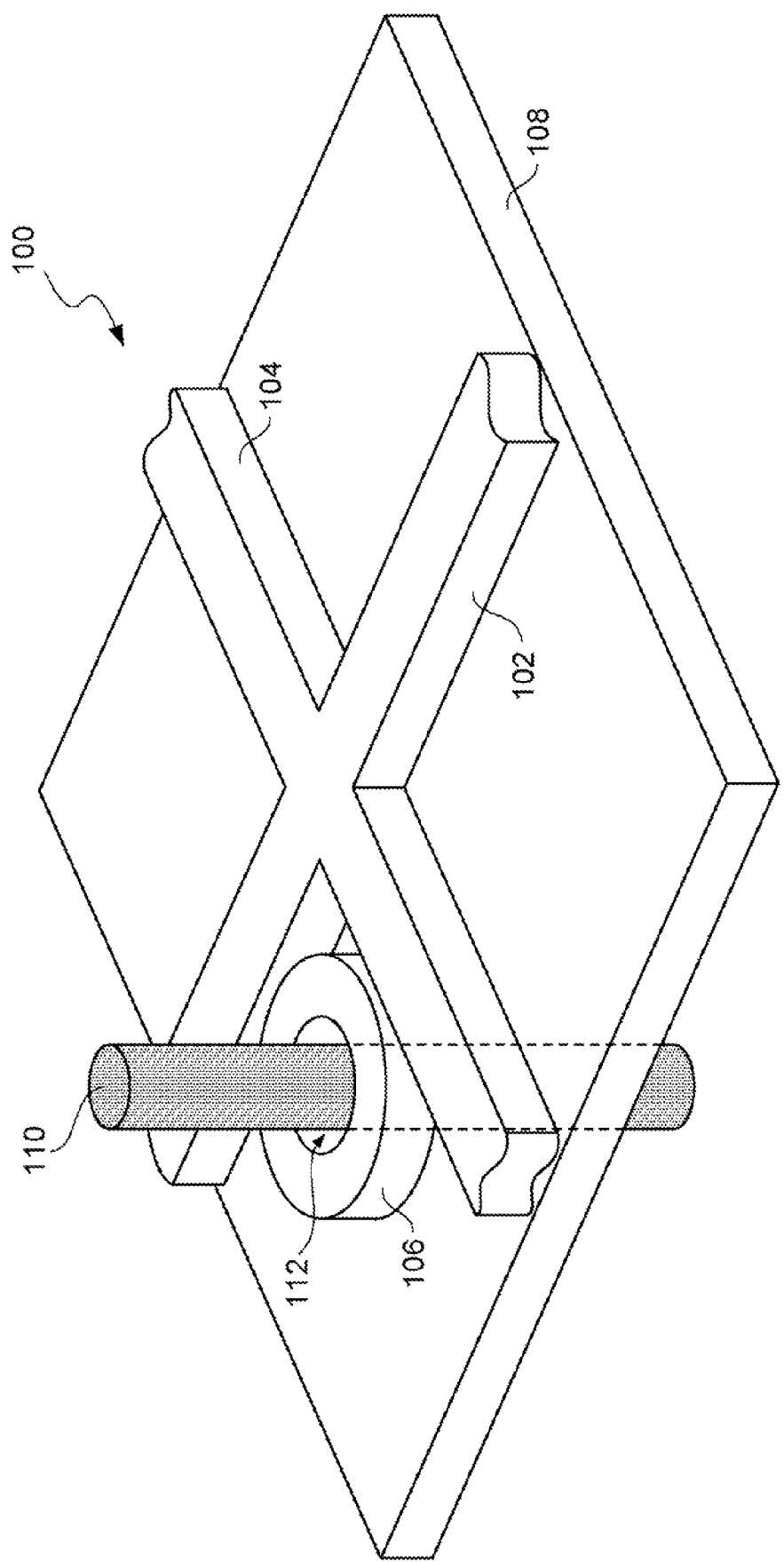
FIG. 1A shows an isometric view of a first photonic switch in accordance with embodiments of the present invention.

Embodiments of the present invention are directed to photonic switches and to switch fabrics employing the same photonic switches. These embodiments employ at least one microring resonator having resonance frequencies that are tunable by inducing a local, solenoidal magnetic field within the microrings. The magnetic field can be induced by passing a current through a wire running through the microring opening. A magneto-optical effect causes circular birefringence within the microrings. In other words, a different phase velocity exists for EMR waves with opposite circular polarizations circulating within the microrings. The circulating EMR ways can be considered to recombine upon emergence from the magnetized microring but with a net phase offset, resulting in a rotation of the angle of linear polarization. Unlike conventional electronic switches and switch fabrics, photonic switches and switch fabrics of the present invention consume less power, provide a higher bandwidth, and do not suffer from substantial loss over longer distances.

In the following description, the terms "photonic" and "photonically" refer to devices that operate with classical and/or quantized EMR having wavelengths that are not limited to just the visible portion of the electromagnetic spectrum. In the various photonic switch and switch fabric embodiments described below, a number of structurally similar components comprising the same materials have been provided with the same reference numerals and, in the interest of brevity, an explanation of their structure and function is not repeated.

Figure 1B:
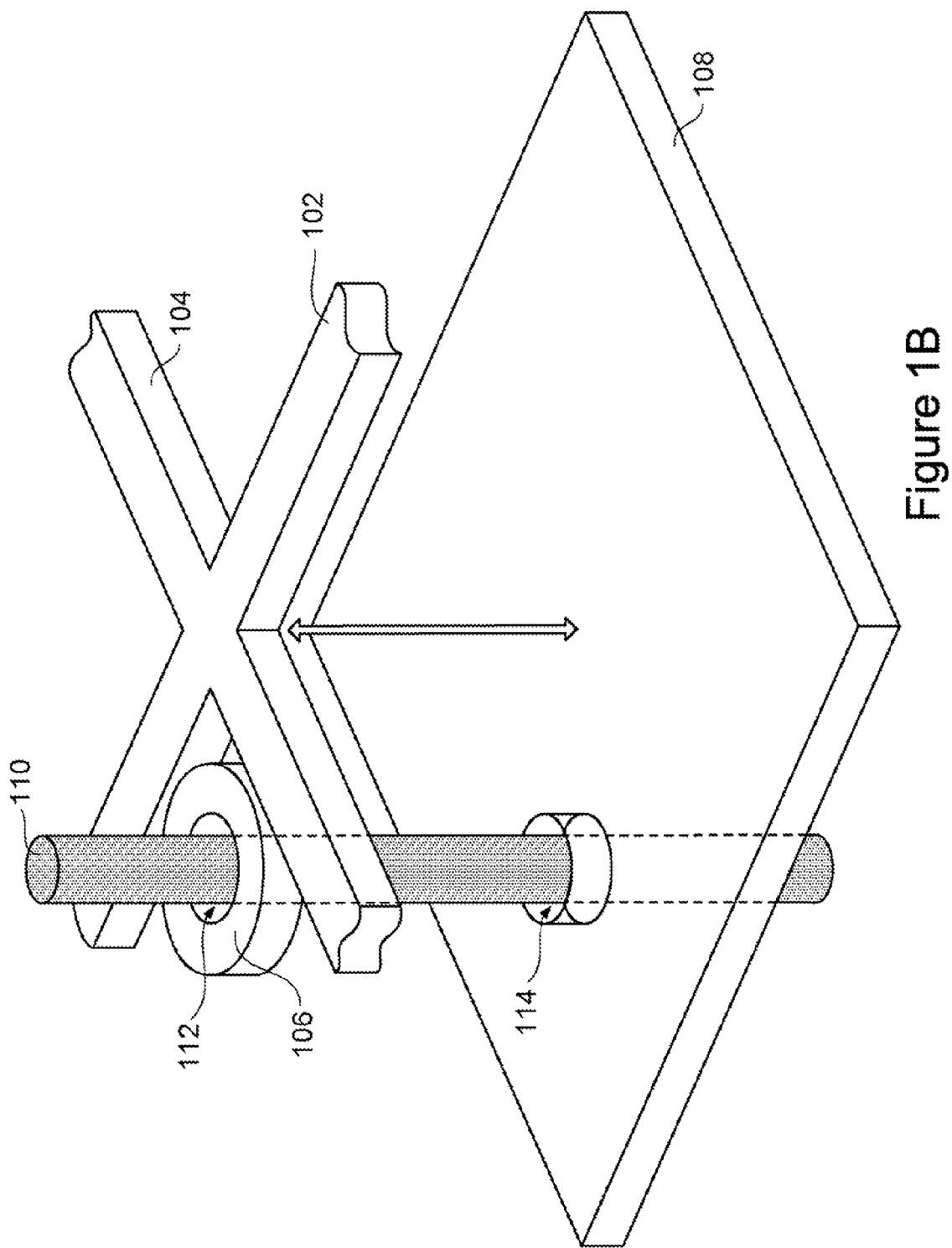
FIG. 1B shows an exploded isometric view of the first photonic switch, shown in FIG. 1A, in accordance with embodiments of the present invention.

FIG. 1A shows an isometric view of a first photonic switch 100 in accordance with embodiments of the present invention. The photonic switch 100 includes a first ridge waveguide 102, a second ridge waveguide 104 intersecting the first waveguide 102, and a tunable microring resonator ("microring") 106, all of which are disposed on a surface of a substrate 108. The photonic switch 100 also includes a wire 110 passing through an opening 112 in the microring 106 and an opening (not shown) in the substrate 108. FIG. 1B shows an exploded isometric view of the photonic switch 100 with the first and second waveguides 102 and 104 and the microring 106 lifted above the substrate 108 in accordance with embodiments of the present invention. FIG. 1B reveals an opening 114 through the substrate 108 in approximate alignment with the opening 112 in the microring 106. The openings 112 and 114 allow the wire 110 to pass through the substrate 108 and the microring 106. The wire 110 extends approximately perpendicular to the substrate 108.

The waveguides 102 and 104 can be comprised of a column IV semiconductor, such as Si and Ge, or a compound III-V semiconductor, where Roman numerals III and V refer to elements in the third and fifth columns of the Periodic Table of the Elements. Examples of suitable compound III-V semiconductors are InP, InAs, GaP, GaN, GaAs, and $In_xGa_{1-x}As_yP_{1-y}$, where the parameters x and y can range between 0 and 1. The choice of composition x and y are well-known in the art. The waveguides can be comprised of other suitable material having a refractive index that is greater than the substrate 108. The substrate 108 can be comprised of a material having a lower refractive index than the waveguides 102 and 104. For example, the substrate 108 can be comprised of $SiO_2$, $Si_3N_4$, $Al_2O_3$, or another suitable dielectric insulating material. The combination of materials selected for the substrate 108 and the waveguides 102 and 104 may depend on matching the lattice constant of the materials selected for the waveguides 102 and 104 with the lattice constant of the materials selected for the substrate 108. The wire 110 can be comprised of silver, gold, copper, nickel, chromium, platinum, aluminum, an alloy thereof, or any other suitable conductor.

Although the wire 110 shown in FIG. 1 has a circular cross-section, embodiments of the present invention are not so limited. The wire 110 can also have square, rectangular, elliptical, or more complex cross sections. The wire 110 may also have many different widths or diameters and aspect ratios or eccentricities, and the wire 110 may have nanoscale to microscale cross-sectional dimensions. For example, the diameter of the wire 110 may range from about 1-2 microns. The waveguides 102 and 104 can be single-mode waveguides with cross-sectional dimensions ranging from about 400-600 nm in width by about 150-450 nm in height. Preferably, these cross-sectional dimensions can be about 500 nm in width by about 250 nm in height, but these dimensions can vary depending on the implementation. Although the intersecting waveguides 102 and 104 appear in FIG. 1 to intersect at about 90°, in other embodiments, the waveguides 102 and 104 can intersect at angles other than 90°, such as angles ranging from about 45° to about 90°. The microring may have an outer diameter of about 7-15 microns and an inner diameter as large as about 10 microns.

The microring 106 shown in FIG. 1 represents many different kinds of suitable microrings that can be used in the photonic switch 100. In other words, the microring 106 can actually be comprised of a number of different materials and components, two of which are described below with reference to FIGS. 2 and 3.

Figure 2A:
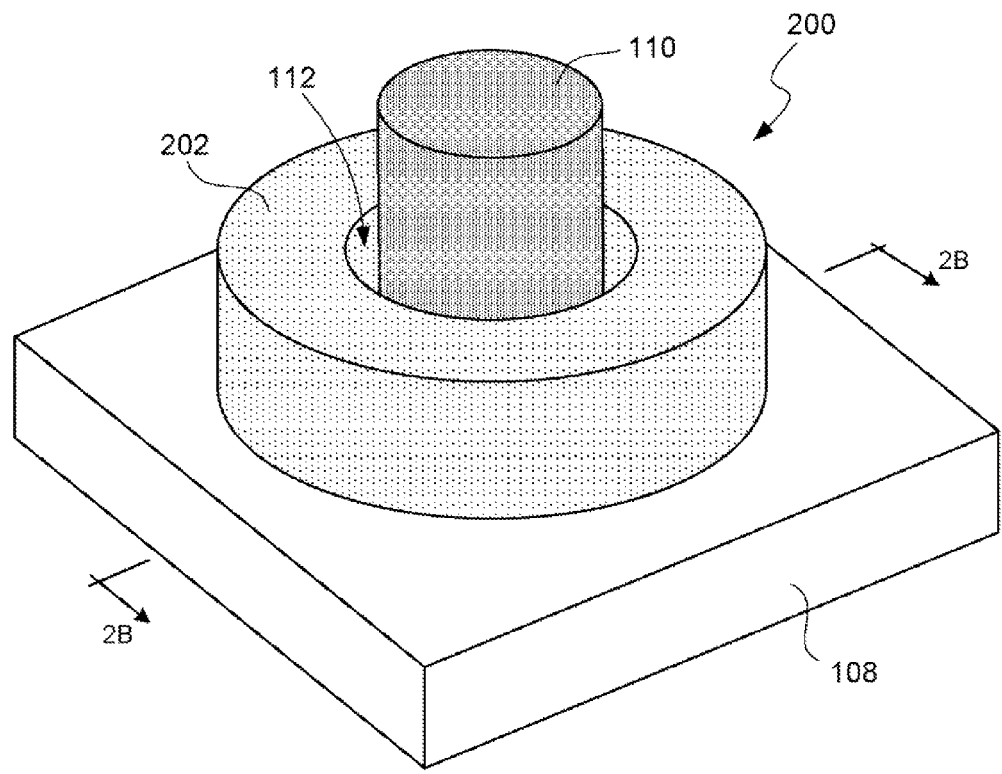
FIG. 2A shows an isometric view of a first tunable microring resonator in accordance with embodiments of the present invention.
Figure 2B:
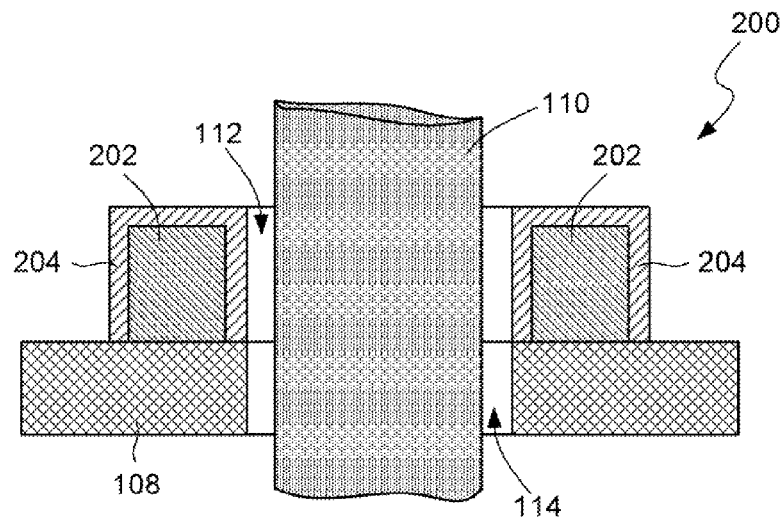
FIG. 2B shows a cross-sectional view of the first tunable microring resonator along a line 2B-2B, shown in FIG. 2A, in accordance with embodiments of the present invention.

FIG. 2A shows an isometric view of a first tunable microring resonator 200 disposed on a portion of the substrate 108 in accordance with embodiments of the present invention. As shown in FIG. 2A, a portion of the wire 110 passes through the opening 112. FIG. 2B shows a cross-sectional view of the microring 200 along a line 2B-2B, shown in FIG. 2A, in accordance with embodiments of the present invention. The wire 110 passes through the opening 112 in the microring 200 and the opening 114 in the substrate 108. FIG. 2B also reveals that the microring 200 includes an inner microring 202 disposed on a surface of the substrate 108. At least a portion of the outer surface of the inner microring 202 is covered with a magnetic material 204. The inner microring 202 can be comprised of a column IV semiconductor or a compound III-V semiconductor, such as InP, InAs, GaP, GaN, GaAs, or $In_xGa_{1-x}As_yP_{1-y}$, as described above with reference to the waveguides 102 and 104. The inner microring 202 can be doped with suitable paramagnetic impurities, such as Mn, Or, Ni, Fe, Co, alloys thereof, rare earth ions, like terbium. The inner microring 202 can also be comprised of commonly used materials for the 700-1100 nm wavelength range, such as terbium doped borosilicate glass and terbium gallium garnet crystal ($Tb_3Ga_5O_{12}$) that have the largest Faraday rotation angles. The magnetic material 204 coats at least a portion of the outer surface of the inner microring 202 and can be comprised of a "soft" ferromagnetic material, such as Ni, Fe, permalloy, which contains about 20% Fe and about 80% Ni and has a very small coercive field, or another suitable ferromagnetic material.

Figure 2C:
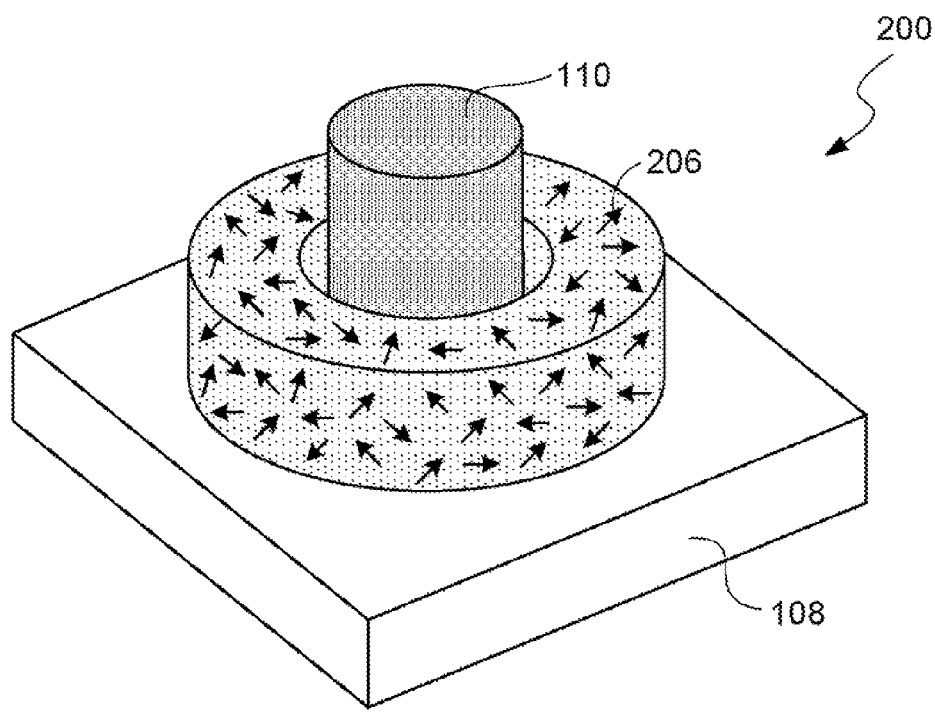
FIGS. 2C-2D show how magnetic moments of the tunable microring resonator, shown in FIGS. 2A-2B, are changed in accordance with embodiments of the present invention.
Figure 2D:
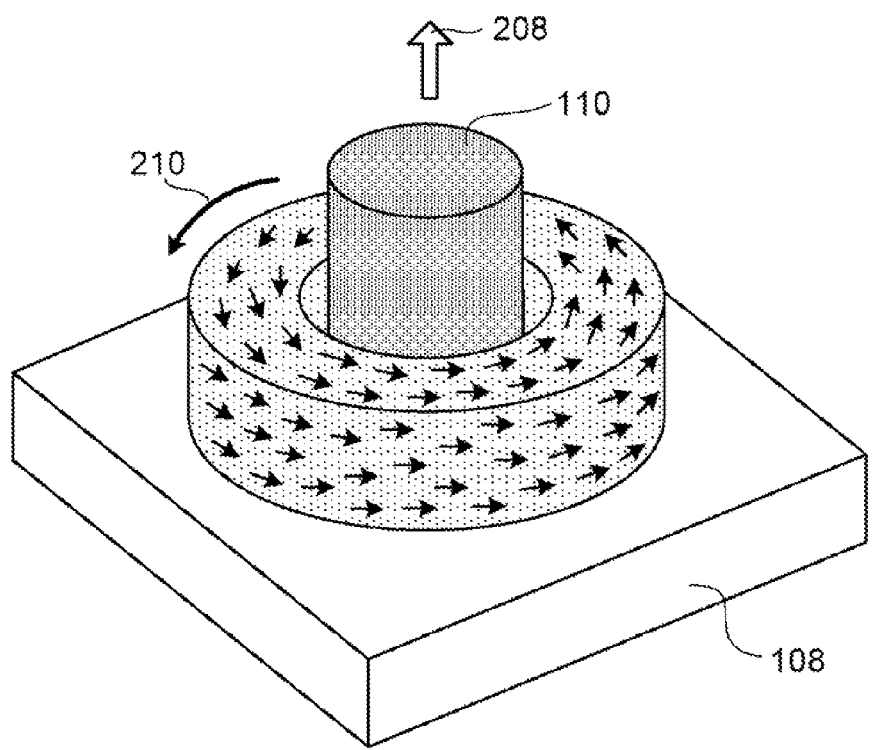

FIGS. 2C-2D show how magnetic moments of the materials comprising the microring 200 are changed when a current is applied to the wire 110 in accordance with embodiments of the present invention. The magnetic moments are represented by directional arrows, such as directional arrow 206. In FIG. 2C, when no current is applied to the wire 110, the magnetic moments are randomly oriented. However, when a current 208 is applied to the wire 110, as shown in FIG. 2D, the magnetic moments are aligned with the direction of the solenoidal magnetic field 210 induced by the current in the wire 110.

Figure 3A:
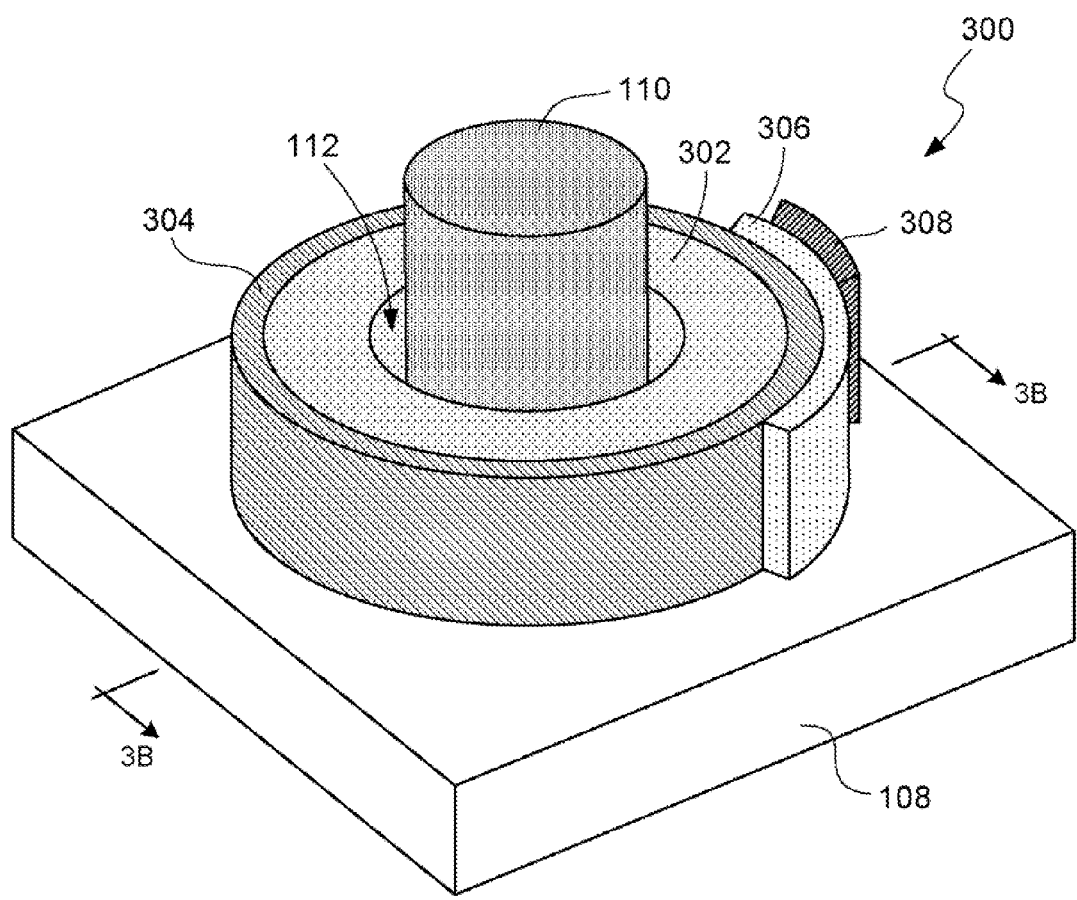
FIG. 3A shows an isometric view of a second tunable microring resonator in accordance with embodiments of the present invention.
Figure 3B:
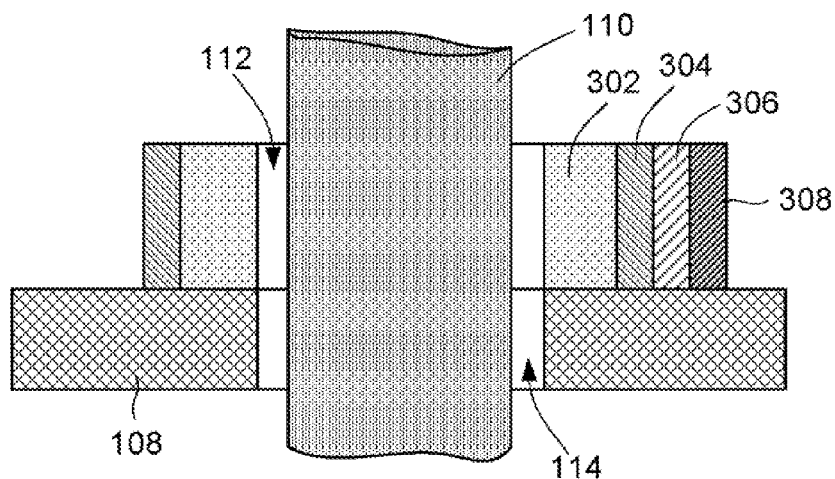
FIG. 3B shows a cross-sectional view of the second tunable microring resonator along a line 3B-3B, shown in FIG. 3A, in accordance with embodiments of the present invention.

FIG. 3A shows an isometric view of a second tunable microring resonator 300 disposed on a portion of the substrate 108 in accordance with embodiments of the present invention. The wire 110 passes through the opening 112. FIG. 3A also shows that the microring 300 is comprised of an inner microring 302, an outer microring 304, and a segment 306. FIG. 3B shows a cross-sectional view of the microring 300 along a line 3B-3B, shown in FIG. 3A, in accordance with embodiments of the present invention. The wire 110 passes through the opening 112 in the microring 300 and the opening 114 in the substrate 108. FIGS. 3A-3B also reveal a segment 306 covering a portion of the outer surface of the outer microring 304 and a pinning stub 308 attached to at least a portion of the outer surface of the segment 306. The inner microring 302 can be comprised of an intrinsic column IV semiconductor, such as Si or Ge, or an intrinsic compound III-V semiconductor, such as GaN or $In_xGa_{1-x}As_yP_{1-y}$, as described above. The outer microring 304 can be comprised of $SiO_2$, $Al_2O_3$, $Si_3N_4$, or another suitable dielectric material. The segment 306 covering a portion of the outer microring 304 can be comprised of a ferromagnetic material, such as Ni, Fe, permalloy, or another suitable ferromagnetic materials. The pinning stub 308 can be comprised of an antiferromagnetic material, such as FeMn, NiO, $Cr_2O_3$, or another suitable antiferromagnetic material.

Figure 3C:
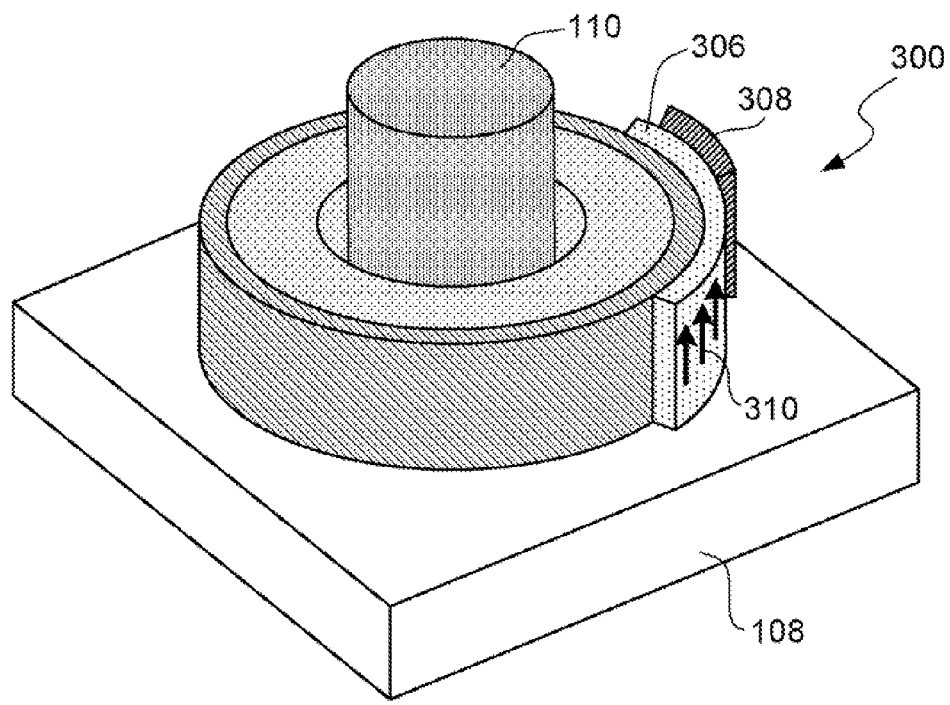
FIGS. 3C-3D show how magnetic moments of the microring, shown in FIGS. 3A-3B, are changed in accordance with embodiments of the present invention.
Figure 3D:
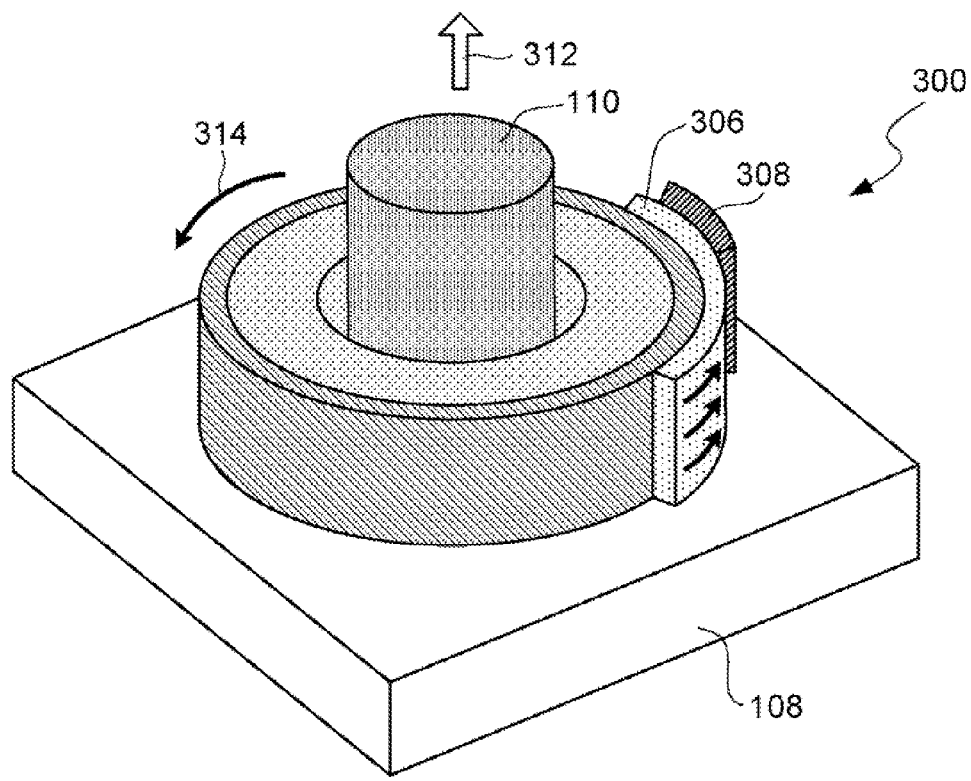

FIGS. 3C-3D show how magnetic moments of the segment 306 are changed when a current is applied to the wire 110 in accordance with embodiments of the present invention. The pinning stub 308 can be deposited and positioned on the segment 306 in order to align the magnetic moments of the segment 306 into a particular direction. For example, as shown in FIG. 3C, when no current is applied to the wire 110, the magnetic moments of the segment 306 can be oriented in the direction represented by the directional arrows, such as directional arrow 310. However, when a current 312 is applied to the wire 110, as shown in FIG. 3D, the magnetic moments of the segment 306 are aligned with the direction of the solenoidal magnetic field circulating in the direction 314 is created.

The microrings 200 and 300 have resonance frequencies that can be tuned by interaction of the corresponding circular-microring modes with the local magnetization induced or changed by the solenoid magnetic field created by the current flowing through the wire 110. The microrings 200 and 300 use a magneto-optical effect to evanescently couple EMR to and from the waveguides 102 and 104. The resonance frequencies of the microrings 200 and 300 cause EMR waves to be decomposed into two circularly polarized waves which propagate at different speeds. For example, EMR waves that are circulating within the microrings 200 and 300 with opposite circular polarizations have different phase velocities when the solenoidal magnetic field is created. These waves recombine upon emergence from the microrings 200 and 300. However, because of the difference in propagation speed they emerge with a net phase difference, resulting in a rotation of the angle of linear polarization. The resonance frequency or wavelength supported by the microrings 200 and 300 shifts. Thus, the current applied to the wire 110 can be used to actively control evanescent coupling of EMR between the waveguides 102 and 104 and the microrings 200 and 300.

The photonic switch 100 is operated by applying an appropriate current or voltage to the wire 110. This can be accomplished by attaching a wire to each end of the wire 110 as described below with reference to FIGS. 4 and 5.

Figure 4:
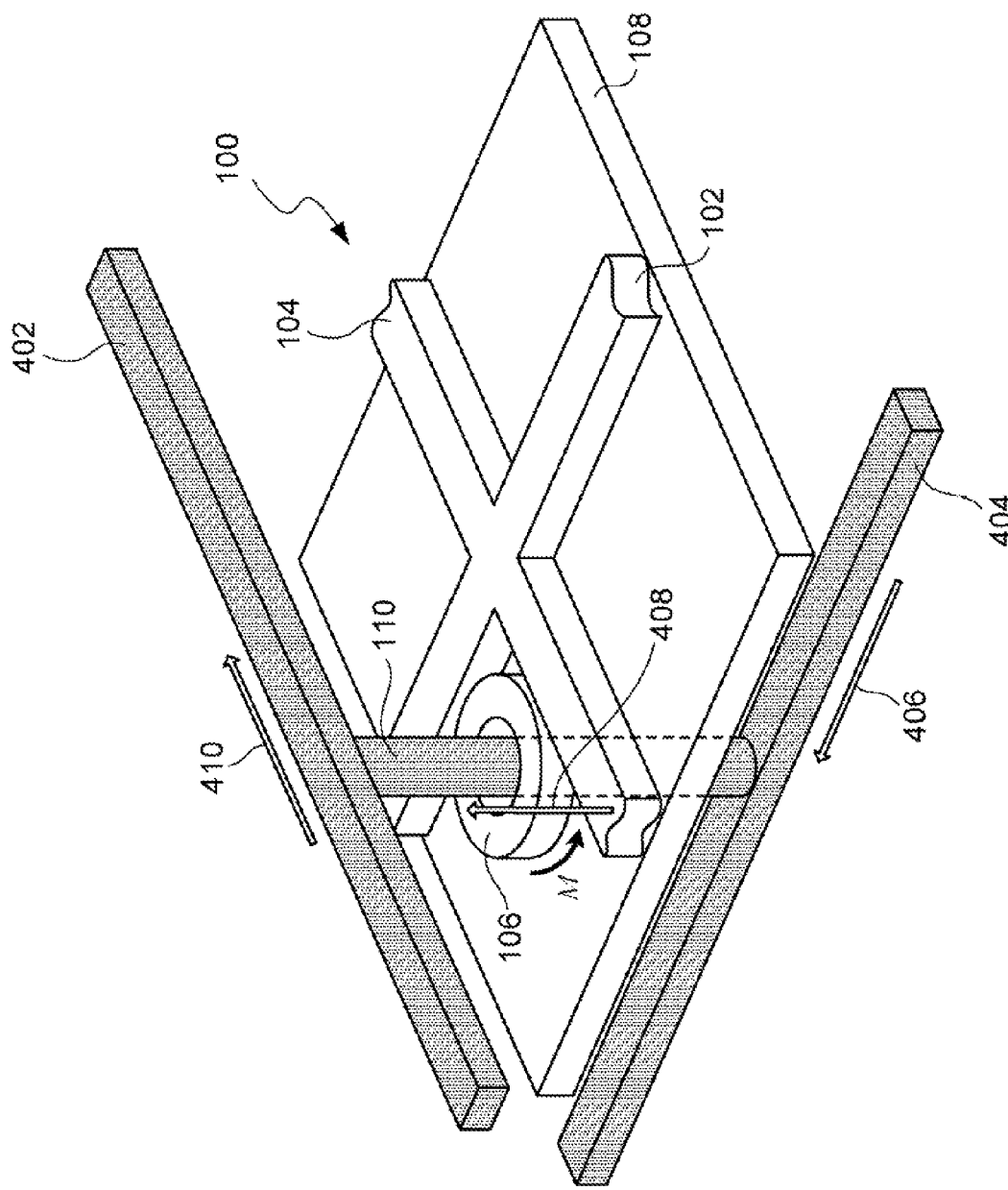
FIG. 4 shows an isometric view of the first photonic switch, shown in FIG. 1, and attached to a first set of wires in accordance with embodiments of the present invention.

FIG. 4 shows an isometric view of the photonic switch 100 and wires 402 and 404 attached to the ends of the wire 110 in accordance with embodiments of the present invention. Although the wires 402 and 404 appear to be perpendicular to one another and horizontal to the plane of the substrate 108, the wires 402 and 404 can be arranged in any suitable configuration for supplying current or voltage to the wire 110. As shown in FIG. 4, the flow of current through the wires 404, 110, and 402 is represented by directional arrows 406, 408, and 410. The current flows from the wire 404 into the wire 110 and out along the wire 402. In other embodiments, the current can of course be reversed.

Figure 5:
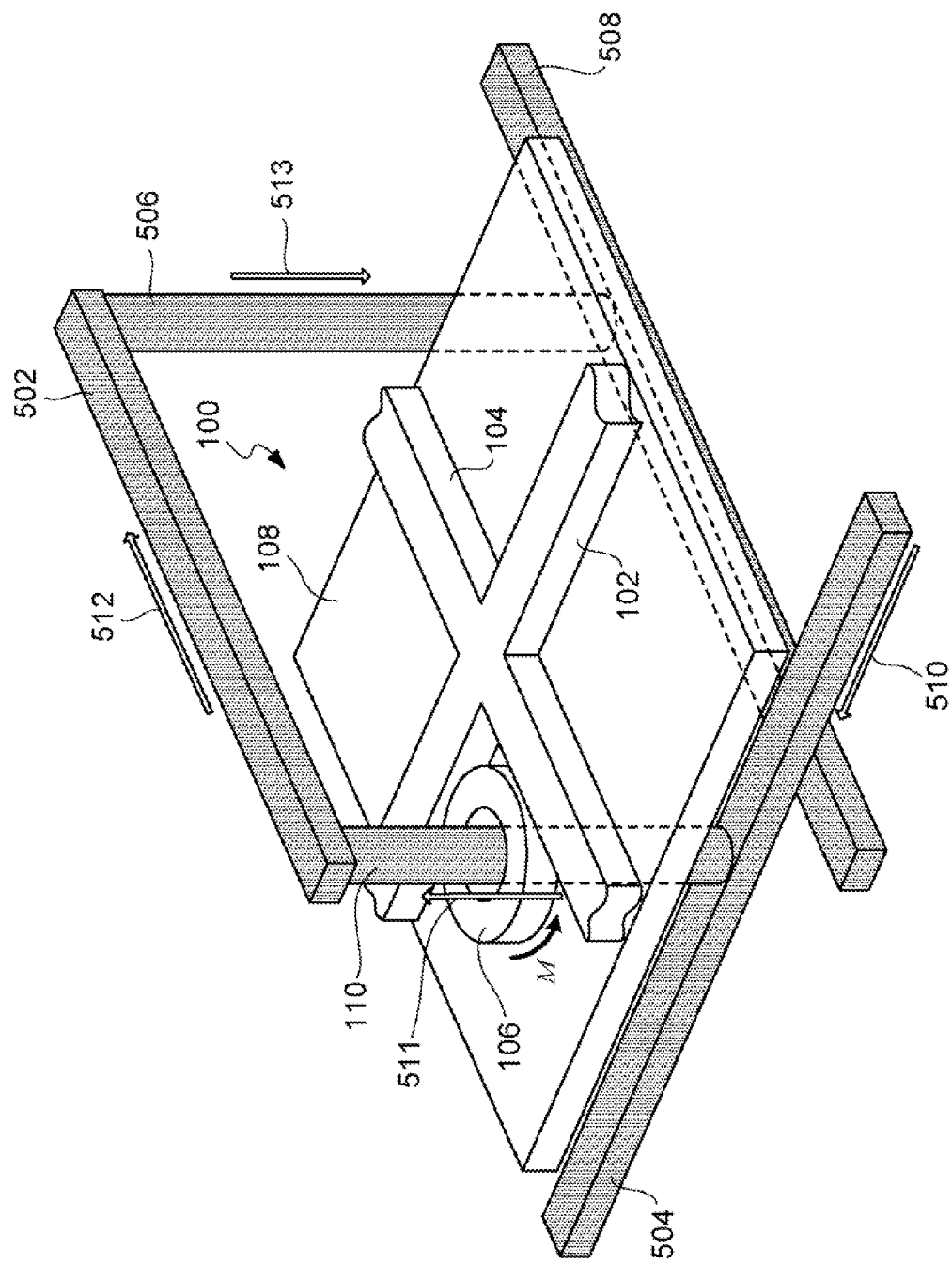
FIG. 5 shows an isometric view of the first photonic switch, shown in FIG. 1, and attached to a second set of wires in accordance with embodiments of the present invention.

FIG. 5 shows a second isometric view of the photonic switch 100 and wires 502 and 504 attached to the ends of the wire 110 in accordance with embodiments of the present invention. As shown in FIG. 5, the wire 502 is also attached to a third wire 506 which, in turn, is attached to a fourth wire 508 that passes under the wire 504. The current flows from the wire 504 into the wire 110 and from the wire 110 to the wire 502 as indicated by directional arrows 510-512. The current then flows from the wire 506 and out through the wire 508 as indicated by directional arrow 513.

An appropriate current applied to the wire 110, as shown in FIGS. 4 and 5, generates a magnetic field of magnitude M in the adjacent microring 106. This magnetic field shifts the resonance of the microring 106 such that a substantially portion of the EMR transmitted in one of the intersecting waveguides can be coupled into the other. In other words, depending on how the microring 106 is configured, the magnetic field can be used to determine whether or not the microring 106 is able to support EMR of a particular frequency, ω. The microring 106 can be operated in the photonic switch 100 in two ways. A first way is described below with reference to FIG. 6, and a second way is described below with reference to FIG. 7.

Figure 6A:
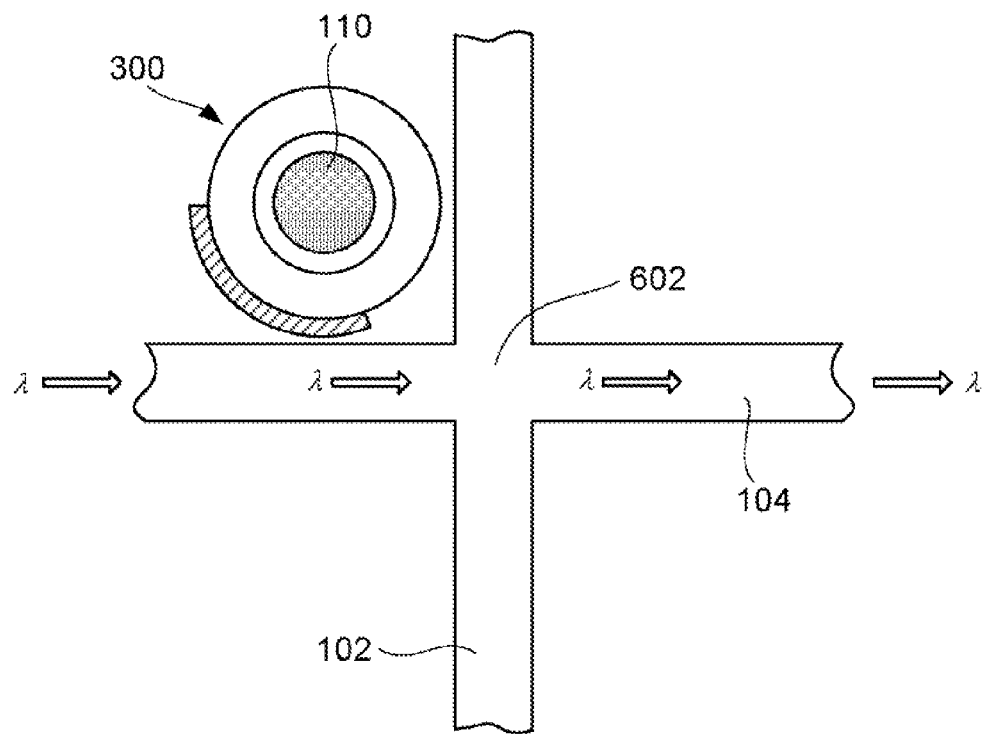
FIGS. 6A-6B show a first operation of the first photonic switch, shown in FIG. 1, in accordance with embodiments of the present invention.
Figure 6B:
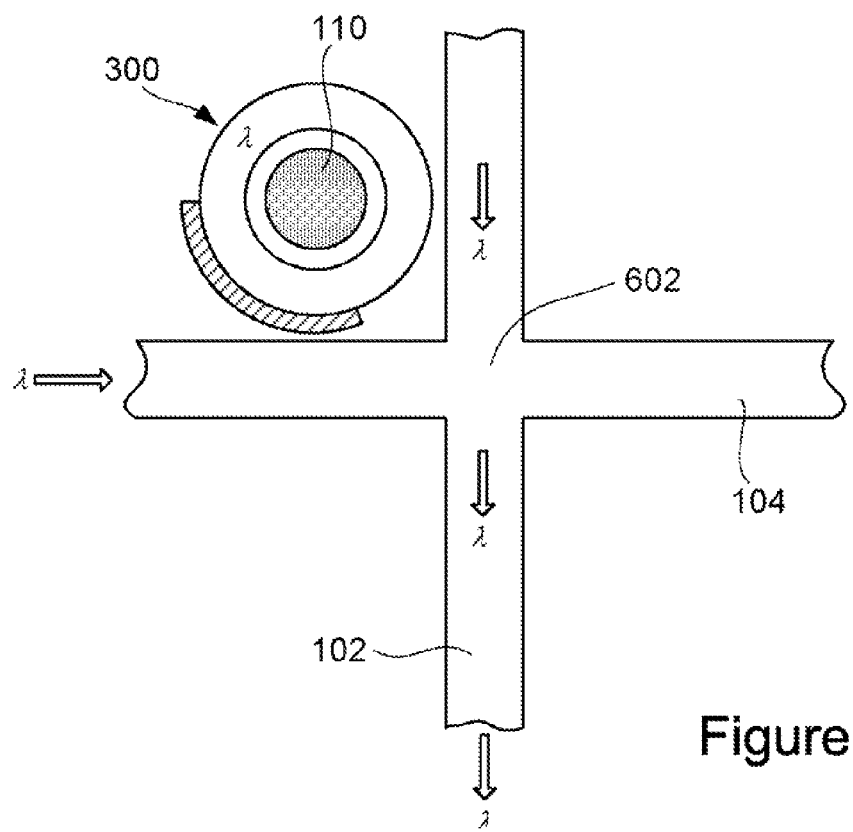

FIGS. 6A-6B show top views of the photonic switch 100 operated in a first way in accordance with embodiments of the present invention. In certain embodiments, the materials and dimensions of the microring 300 can be selected such that the microring 300 does not have resonance with, or cannot support, a channel λ with the frequency ω transmitted along the waveguide 104. As a result, after inputting the channel λ into the waveguide 104, as shown in FIG. 6A, the channel λ passes the microring 300 unaffected, passes through the intersection 602 and out along the remainder of the waveguide 104, as shown in FIG. 6A. Note that some loss of the channel λ intensity may occur at the intersection 602. This loss may occur as a result of a portion of the channel λ spilling over into the intersecting waveguide 102 due to diffraction at the corners of the intersection 602. This spillover occurs in both directions of the waveguide 102, but the intensity of the EMR entering the intersecting waveguide 102 is insignificant when compared to the intensity of the channel λ that continues to propagate along the waveguide 104.

Next, as shown in FIG. 6B, applying an appropriate current to the wire 110, as described above with reference to FIGS. 4 and 5, generates a magnetic field around the microring 300. This magnetic field shifts the resonance of the microring 300 into resonance with the frequency ω of the channel λ transmitted along the waveguide 104. As a result, a substantial portion of the channel λ propagating along the waveguide 104 can be evanescently couple into the microring 300, circulate within the microring 300, and evanescently couple from the microring 300 into the intersecting waveguide 102. The channel λ then propagates along the waveguide 102. Here, loss of the channel λ intensity may occur as a result of a portion of the channel λ not evanescently coupling into the microring 300 and continuing to propagate along the waveguide 104, and loss may occur again at the intersection 602.

Figure 7A:
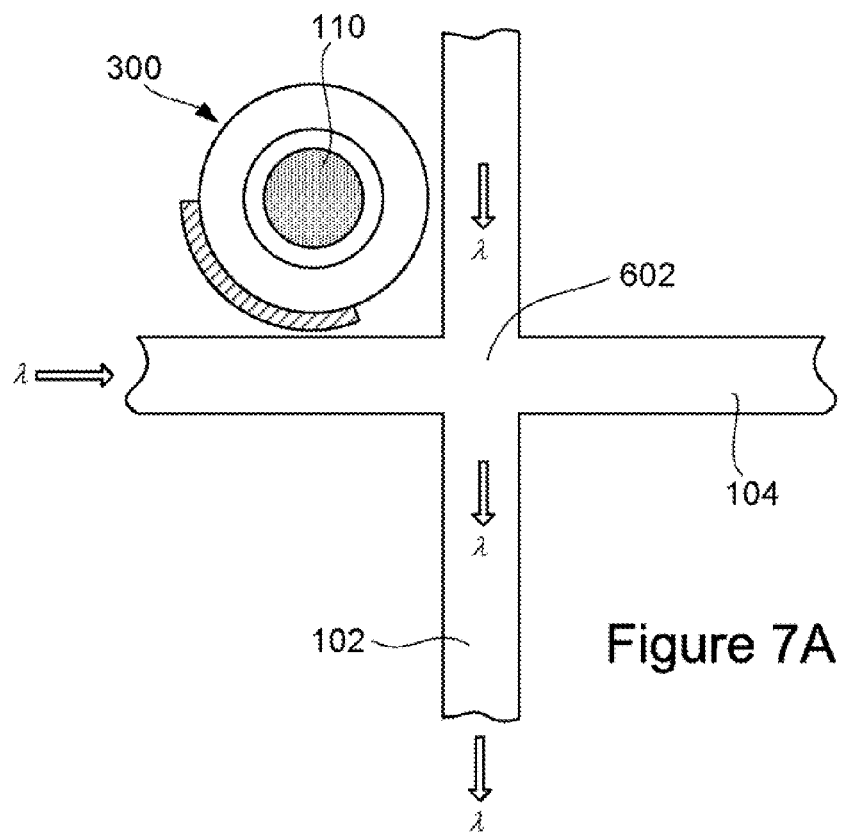
FIGS. 7A-7B show a second operation of the first photonic switch, shown in FIG. 1, in accordance with embodiments of the present invention.
Figure 7B:
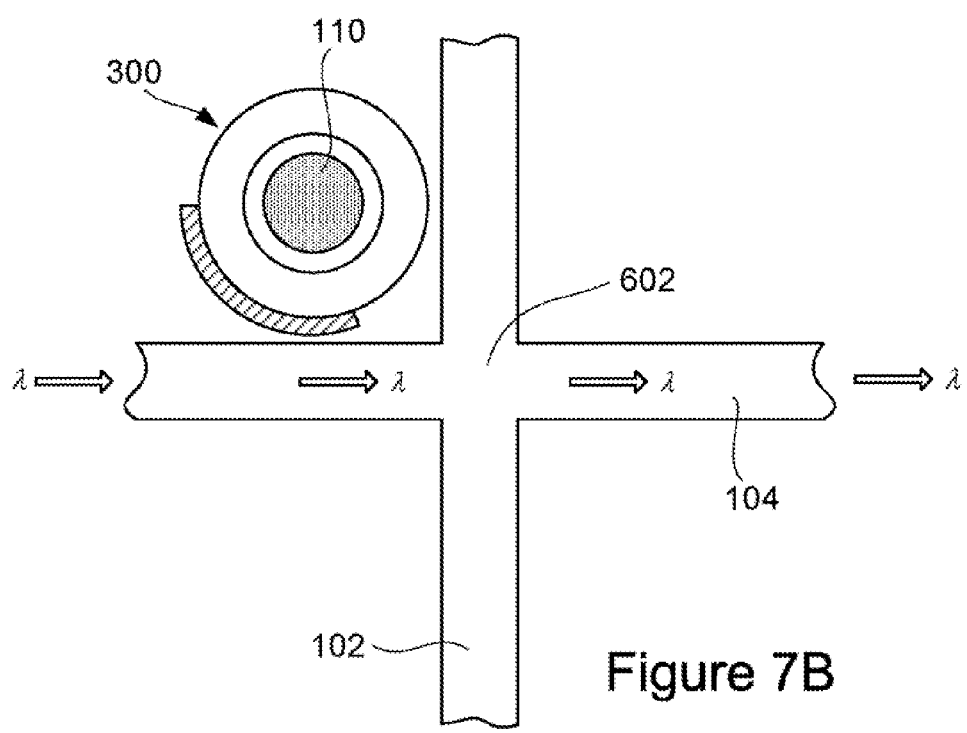

FIGS. 7A-7B show top views of the photonic switch 100 operated in a second way in accordance with embodiments of the present invention. In other embodiments, the materials and dimensions of the microring 300 can be selected so that the microring 300 has resonance with the frequency ω of the channel λ without generating the magnetic field as described above. As shown in FIG. 7A, because the microring 300 can support the channel λ, a substantial portion of the channel λ can evanescently couple into the microring 300, circulate within the microring 300, and evanescently couple from the microring 300 into the intersecting waveguide 1.02. The channel λ then propagates along the waveguide 102. Loss of the channel λ intensity may occur at the intersection 602, and a portion of the channel λ may not evanescently couple into the microring 300 leaving a portion to propagate along the waveguide 104.

Next, as shown in FIG. 7B, applying an appropriate current to the wire 110, as described above with reference to FIGS. 4 and 5, generates a magnetic, field around the microring 300. This magnetic field shifts the resonance of the microring 300 the frequency ω of the channel λ. As a result, the channel λ passes the microring 300 unaffected, passes through the intersection 602 and out along the remainder of the waveguide 104. As described above, loss of the channel λ intensity may occur at the intersection 602, but the intensity of the EMR entering the intersecting waveguide 102 is not significant when compared to the intensity of the channel λ that continues to propagate along the waveguide 104.

Figure 8:
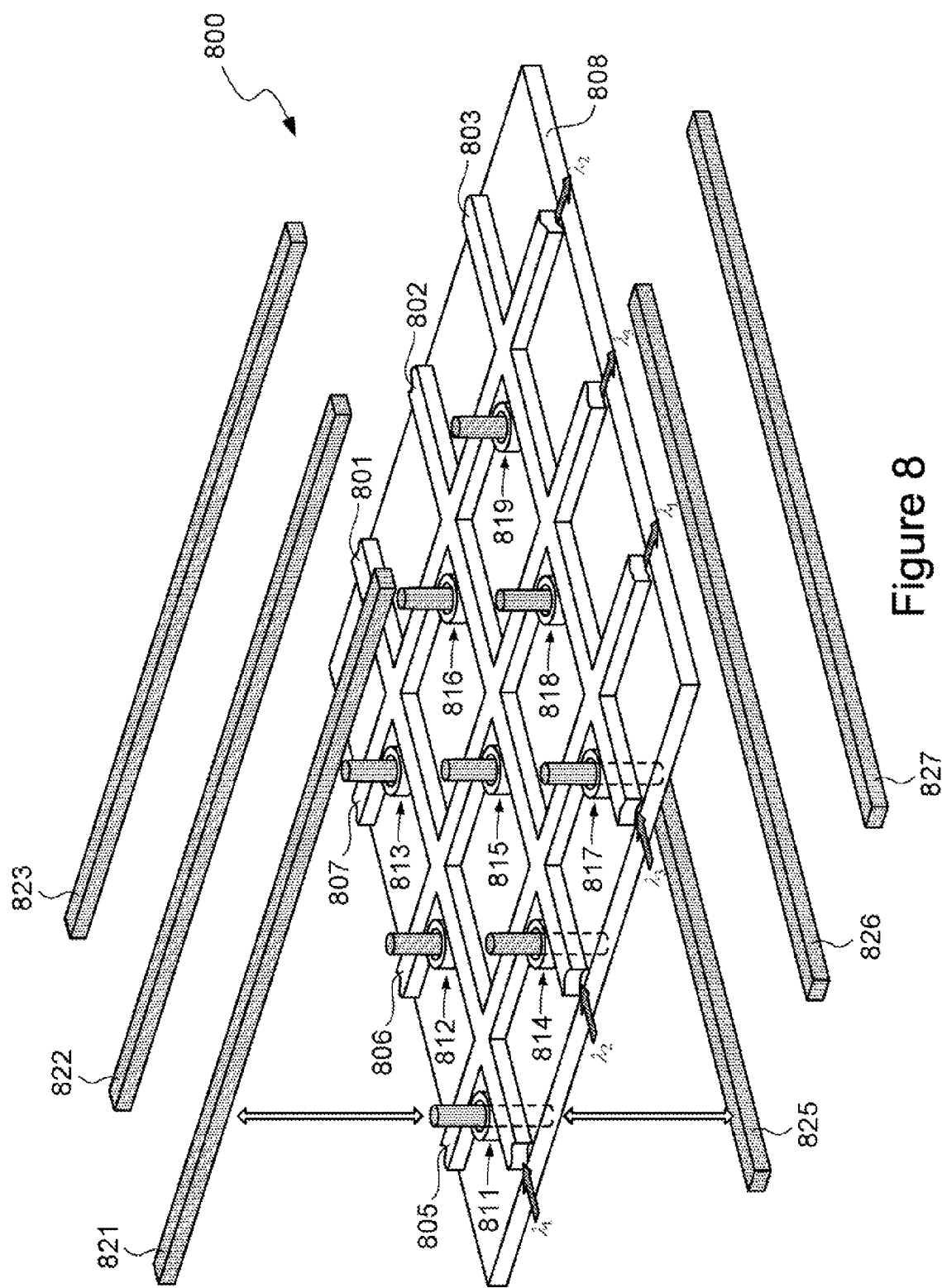
FIG. 8 shows an exploded isometric view of a first switch fabric in accordance with embodiments of the present invention.

A number of the photonic switches 100 can be assembled to form a switch fabric that can be used to transmit channels between various kinds of data processing, storing, or transmitting devices. FIG. 8 shows an exploded isometric view of a first switch fabric 800 in accordance with embodiments of the present invention. The switch fabric 800 includes a first set of three approximately parallel 801-803 waveguides intersecting a second set of three approximately parallel waveguides 805-807 all of which are disposed on a surface of a substrate 808. The switch fabric 800 includes nine photonic switches 811-819 disposed on the surface of the substrate 808. Each photonic switch is positioned in proximity to the intersection of two intersecting ridge waveguides, as described above with reference to FIG. 1. As shown in FIG. 8, the switch fabric 800 also includes a first set of three wires 821-823 and a second set of three wires 825-827 located at approximately right angles to the first set of wire 821-823. For simplicity of illustration, the wires 821-823 and the wires 825-827 are shown detached from the wires of the photonic switches 811-819. During operation of the switch fabric 800, the wires in the first set of wires 821-823 are electronically coupled to the wires in the columns of photonic switches, and the wires in the second set of wires 825-827 can be photonically coupled to the wires in the rows of photonic switches. For example, the wire 821 can be electronically coupled to the wires of the photonic switches 811, 814, and 817, and the wire 825 can be electronically coupled to the wires of the photonic switches 811, 812, and 813. Note that the switch fabric 800 can be scaled down or up to accommodate any number of intersecting waveguides and photonic switches.

The photonic switches 811-819 can be configured and operated in accordance with the two different operational embodiments described above with reference to FIGS. 6 and 7. For the sake of brevity, the following is a description of the operation of the switch fabric 800 in accordance with the operational embodiment described above with reference to FIG. 6. In other words, it is assumed that the photonic switches 811-819 are configured to operate in accordance with the embodiment described above with reference to FIG. 6. The switch fabric 800 receives three different channels $\lambda_1$, $\lambda_2$, and $\lambda_3$ on the three waveguides 801-803, respectively. The photonic switches 811-819 can be configured so that the associated microrings are not resonant with the channels $\lambda_1$, $\lambda_2$, and $\lambda_3$ propagating along the waveguides 801-803, respectively. For example, the photonic switches 811-813 may have associated microrings that are configured to not be in resonance with the channel $\lambda_1$, and, therefore, the channel $\lambda_1$ is not evanescently coupled via the associated microrings into the intersecting waveguides 805-807. The photonic switches 811-819 can also be configured so that when an appropriate current is applied to the associated wires, the microrings are resonant with the channels $\lambda_1$, $\lambda_2$, and $\lambda_3$ propagating along the waveguides 801-803. For example, when an appropriate current is applied to the wire of the photonic switch 811 via the wires 821 and 825, the associated microring is resonant with the channel $\lambda_1$ such that the channel $\lambda_1$ evanescently couples into the waveguide 805. When an appropriate current is applied to the wire of the photonic switch 816 via the wires 823 and 826, the associated microring is resonant with the channel $\lambda_2$ such that the channel $\lambda_2$ evanescently couples into the waveguide 807.

In other embodiments, rather than placing the waveguide layer and substrate 808 between the first set of wires 821-823 and the second set of wires 825-827, the wires running through the photonic switches 811-819 can each be connected to wires as described above with reference to FIG. 5. In other words, each of the wires running through a microring of the photonic switches 811-819 can be connected to two wires, such as wires 504 and 502, and wires, such as wire 506, can pass through openings in the substrate 808 to connect with wires, such as wire 508.

Figure 9:
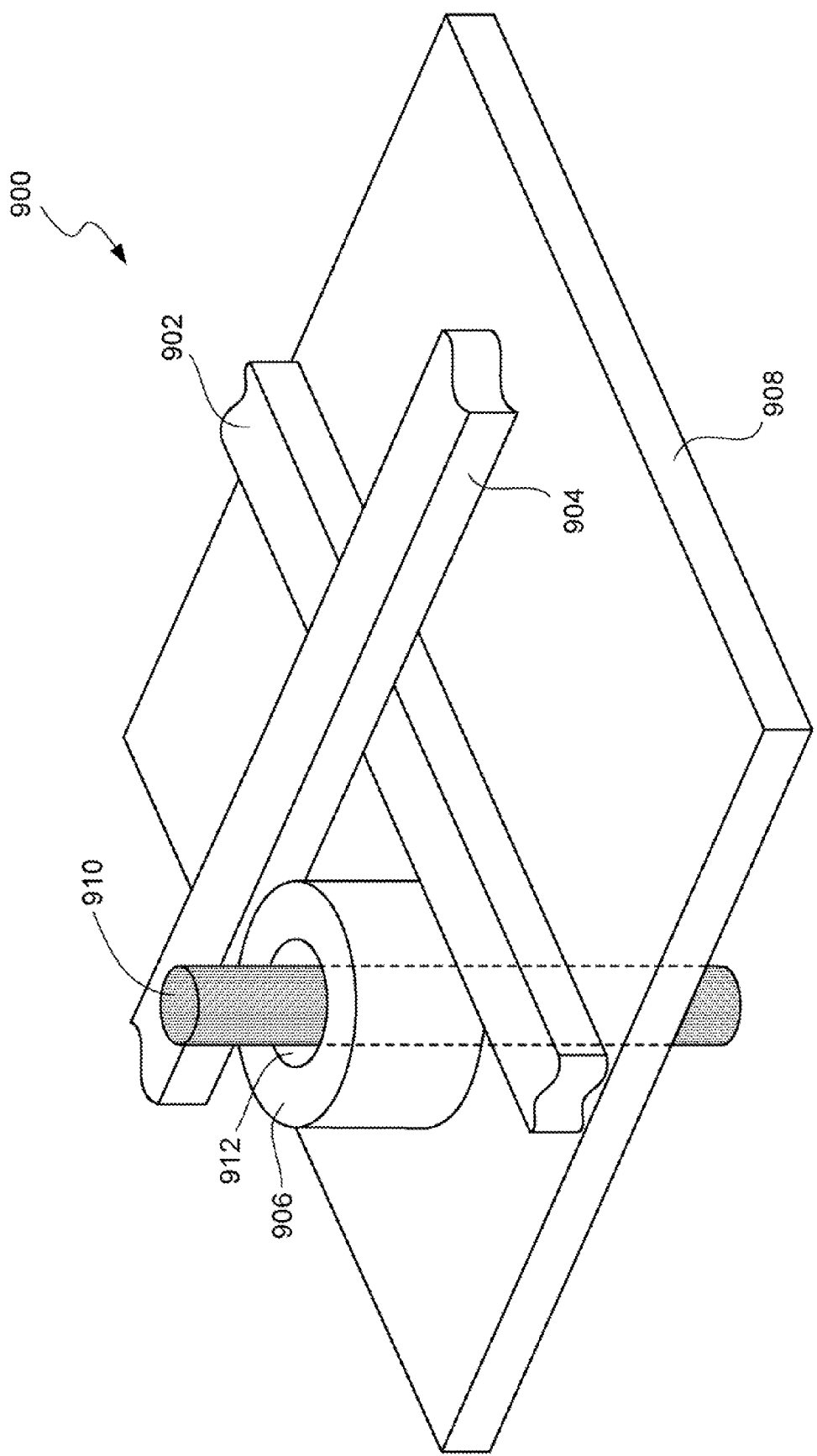
FIG. 9 shows an isometric view of a second photonic switch in accordance with embodiments of the present invention.

In order to reduce loss of a channel due to diffraction at a waveguide intersection, such as intersection 602, in other embodiments, the intersecting waveguides, such as waveguides 102 and 104, can be replaced by a first waveguide that is overlain by a second waveguide. FIG. 9 shows an isometric view of a second photonic switch 900 in accordance with embodiments of the present invention. The photonic switch 900 includes a first ridge waveguide 902, a second ridge waveguide 904 overlaying the first waveguide 902, and a microring 906. The first waveguide 902 and the microring 906 are disposed on a substrate 908, and the second waveguide 904 can be in contact with the first waveguide 902 or suspended above the first waveguide 902 by a support (not shown). Although the microring 906 can be configured as described above with reference to FIGS. 2 and 3, the height of the microring 906 is greater than the height of the microring 106 in order to evanescently couple a channel resonating in the microring 906 into the waveguide 904. The photonic switch 900 also includes a portion of a wire 910 passing through an opening 912 in the microring 906 and an opening (not shown) in the substrate 908. The photonic switch can be comprised of the same materials as the first photonic switch 100 and operated in the same manner as described above with reference to FIGS. 6 and 7. In addition, configuring the photonic switch 900 with separate first and second waveguides 902 and 904 may reduce the amount of loss due to diffraction, as described above with reference to FIGS. 6 and 7.

In other embodiments, the first waveguide 902 can be fabricated on a surface of the a substrate, as shown in FIG. 9, and the second waveguide 904 can also be fabricated on the same substrate but with the waveguide 904 arching over the first waveguide 902 where the two waveguides cross. This configuration employs the shorter microring 106 and the same coupling as the photonic switch 900 but without the diffraction associated with the waveguides of the photonic switch 100.

Figure 10:
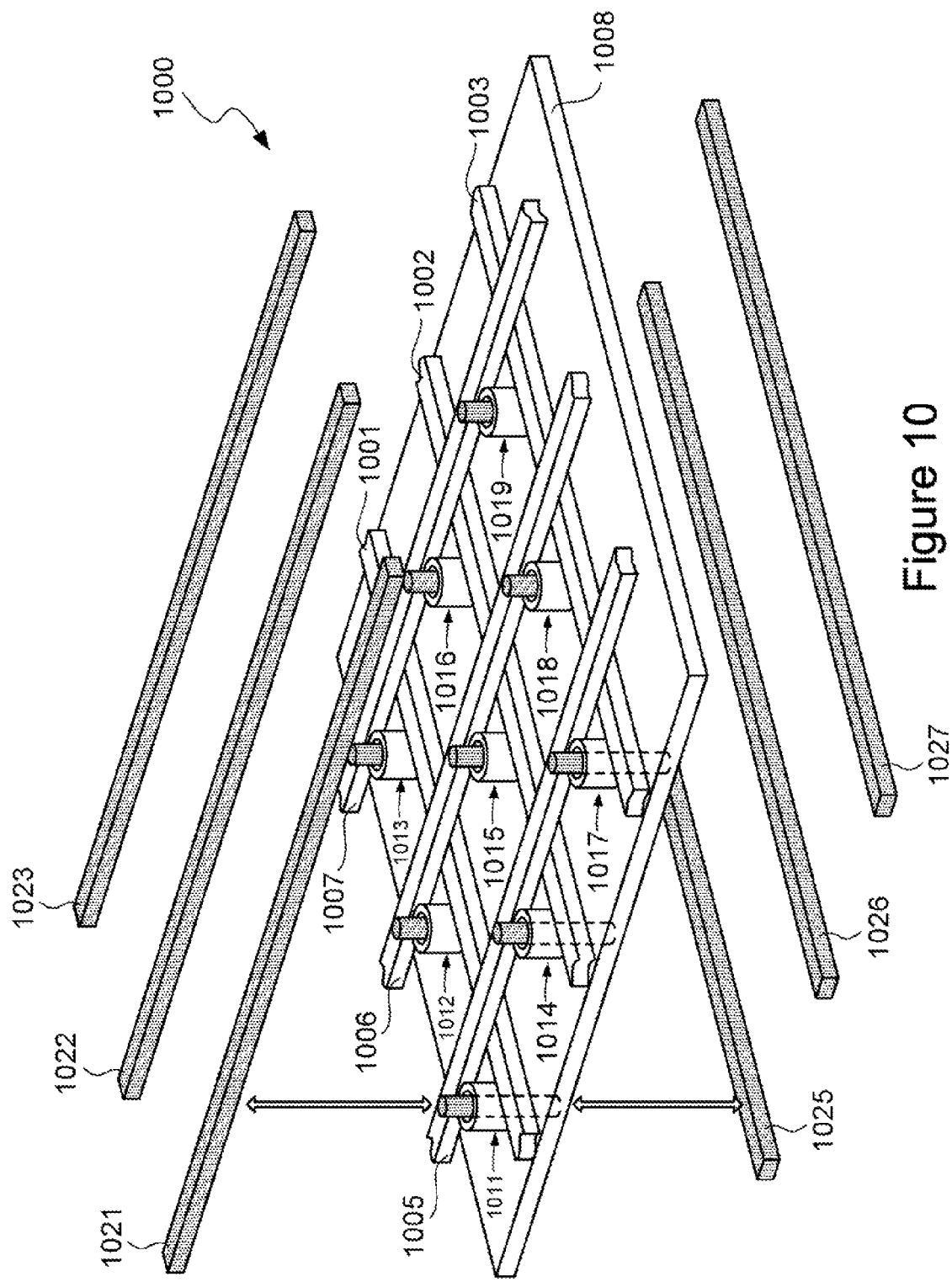
FIG. 10 shows an exploded isometric view of a second switch fabric in accordance with embodiments of the present invention.

In other embodiments, the photonic switch 900 can also be employed as photonic switches in switch fabrics. FIG. 10 shows an exploded isometric view of a second switch fabric 1000 in accordance with embodiments of the present invention. The switch fabric 1000 includes a first set of three approximately parallel waveguides 1001-1003 and a second set of three approximately parallel waveguides 1005-1007 that overlay the first set of waveguides 1001-1003. The waveguides 1001-1003 are disposed on the surface of a substrate 1008. The switch fabric 1000 also includes nine photonic switches 1011-1019 disposed on the surface of the substrate 1008. The photonic switches 1011-1019 are positioned in proximity to two overlaying ridge waveguides, as described above with reference to FIG. 9. As shown in FIG. 10, the switch fabric 1000 also includes a first set of three wires 1021-1023 and a second set of three wires 1025-1027 located at approximately right angles to the first set of wire 1021-1023. For simplicity of illustration, the wires 1021-1023 and the wires 1025-1027 are shown detached from the wires of the photonic switches 1011-1019. The wires in the first set of wires 1021-1023 are electronically coupled to the wires in the columns of photonic switches, and the wires in the second set of wires 1025-1027 can be photonically coupled to the wires in the rows of photonic switches. For example, the wire 1021 can be electronically coupled to the wires of the photonic switches 1011, 1014, and 1017, and the wire 1025 can be electronically coupled to the wires of the photonic switches 1011, 1012, and 1013. The photonic switches 1011-1019 can operated in the same manner as the photonic switches of the switch 800 described above with reference to FIG. 8. Note that the switch fabric 1000 can be scaled down or up to accommodate any number of overlapping waveguides and photonic switches.

Figure 11:
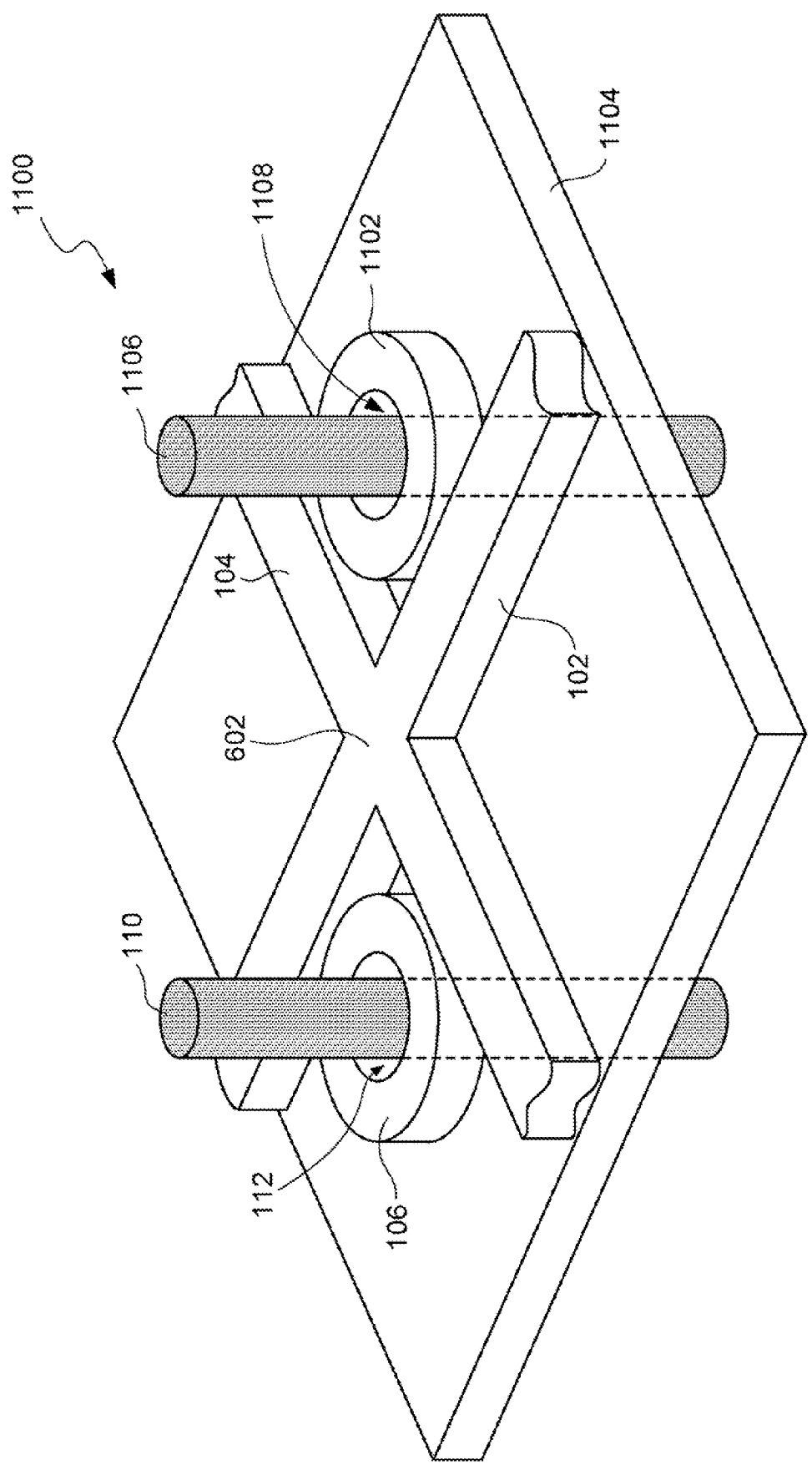
FIG. 11 shows an isometric view of a third photonic switch in accordance with embodiments of the present invention.

In order to reduce the loss associated with not fully evanescently coupling a channel into a first microring, as described above with reference to FIGS. 6 and 7, a second microring can be employed. FIG. 11 shows an isometric view of a third photonic switch 1100 in accordance with embodiments of the present invention. The photonic switch 1100 is identical to the photonic switch 100 except the photonic switch 1100 includes an additional tunable microring resonator 1202 disposed on the surface of a substrate 1104 opposite the microring 906. The photonic switch 1100 also includes a second wire 1106 passing through an opening 1108 in the microring 1102 and an opening (not shown) in the substrate 1104. The elements of the photonic switch 1100 can be comprised of the same materials as the first photonic switch 100, and the microring 1102 can have the same configuration and be comprised of the same materials as the microrings 200 and 300 described above with reference to FIGS. 2 and 3.

The microrings 106 and 1102 are operated by applying appropriate currents to the wires 110 and 1106, as described above with reference to FIGS. 6 and 7. For example, the microrings 106 and 1102 can be configured in the same manner as the microrings described above with reference to FIG. 6. Applying an appropriate current to the wire 110 causes the resonance of the microring 106 to shift into resonance with a channel propagating along the waveguide 104. Although, a substantial portion of this channel evanescently couples from the waveguide 104 into the waveguide 102 via the microring 106, a portion of the channel may continue to propagate beyond the intersection 602. Applying an appropriate second current to the wire 1106 causes the resonance of the microring 1102 to shift into resonance with the channel, evanescently coupling more of the channel into the waveguide 102. As a result, loss resulting from a portion of the channel passing the microring 106 without being coupled into the microring 106 may be reduced by including the microring 1102.

Figure 12:
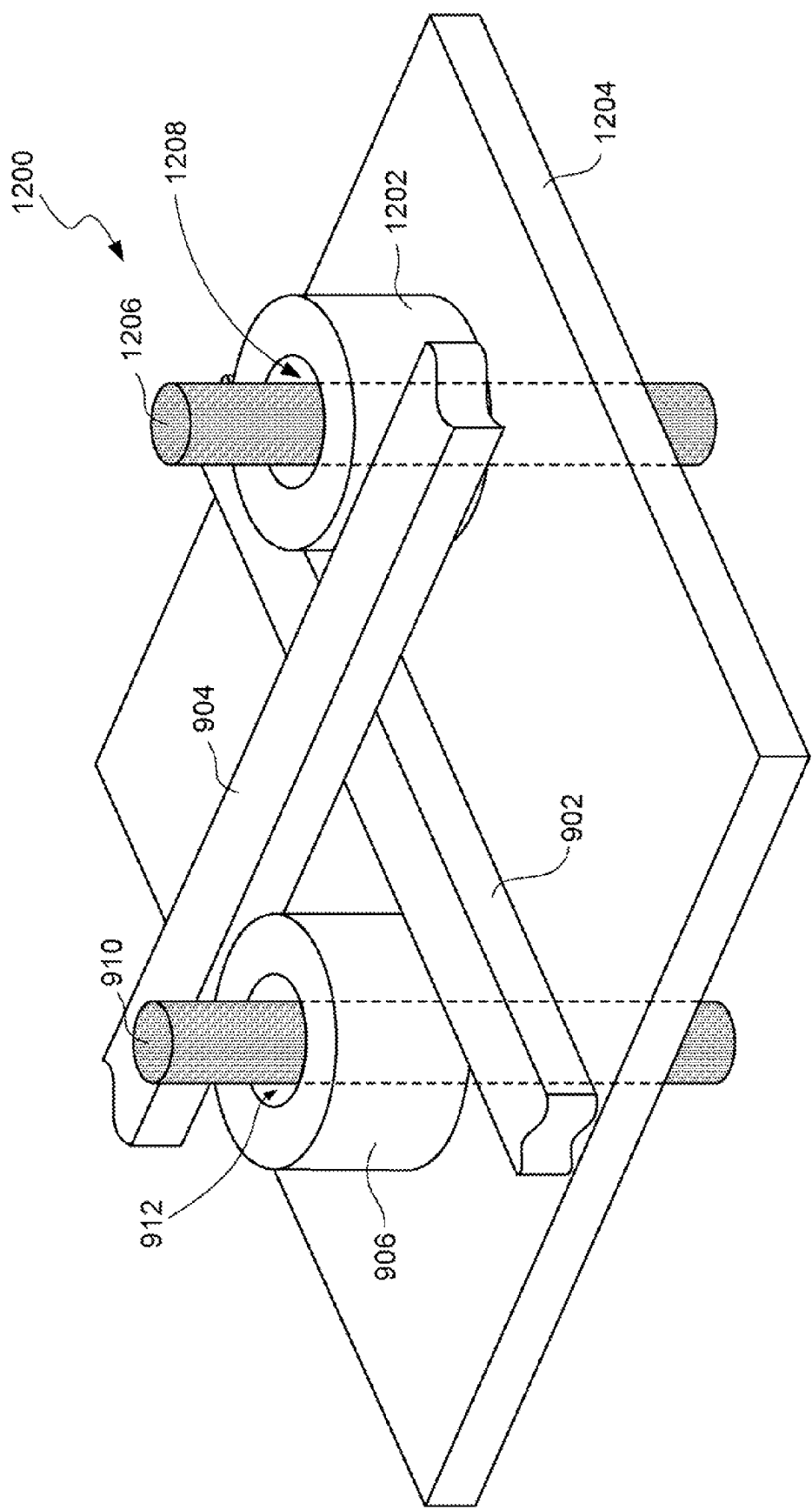
FIG. 12 shows an isometric view of a fourth photonic switch in accordance with embodiments of the present invention.

In other embodiments, the channel loss prevention measures of the photonic switches 900 and 1100 can be combined to form a fourth photonic switch. FIG. 12 shows an isometric view of a fourth photonic switch 1200 in accordance with embodiments of the present invention. The photonic switch 1200 is identical to the photonic switch 900 except the photonic switch 1200 includes an additional tunable microring resonator 1202 disposed on the surface of a substrate 1204 and a wire 1206 passing through a hole 1208 in the microring 1202 and a hole (not shown) in the substrate 1204. The elements of the photonic switch 1200 can be comprised of the same materials as the first photonic switch 100, and the microring 1202 can have the same configuration and be comprised of the same materials as the microrings 200 and 300 described above with reference to FIGS. 2 and 3.

Although the present invention has been described in terms of particular embodiments, it is not intended that the invention be limited to these embodiments. Modifications within the spirit of the invention will be apparent to those skilled in the art. For example, in other embodiments of the present invention, those skilled in the art will immediately recognize that the switch fabric 800 can be modified to include the photonic switches 1100 at intersecting waveguides, and that the switch fabric 1000 can be modified to include the photonic switches 1200 at the overlaying waveguides.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A photonic switch comprising:
    a first waveguide disposed on a surface of a substrate in proximity to an opening in the substrate;
    a second waveguide crossing the first waveguide and positioned in proximity to the opening in the substrate;
    a tunable microring resonator disposed on the surface of the substrate adjacent to the first waveguide and the second waveguide and having an opening aligned with the opening in the substrate; and
    a wire that passes through the opening in the microring and the opening in the substrate, wherein an appropriate current applied to the wire generates a magnetic field in the microring, the magnetic field shifts resonance of the microring in order to switch electromagnetic radiation between the first and second waveguides.

2. The photonic switch of claim 1 wherein the substrate further comprises a material selected from the group consisting of:

SiO$_2$;
Al$_2$O$_3$;
Si$_3$N$_4$; and
any other suitable dielectric material.

3. The photonic switch of claim 1 wherein the first ridge waveguide and the second ridge waveguide further comprise a material selected from the group consisting of:
   a column IV semiconductor;
   a III-V compound semiconductor; and
   a II-VI compound semiconductor.

4. The photonic switch of claim 1 wherein the microring further comprises:
   an inner microring; and
   a magnetized outer layer.

5. The photonic switch of claim 4 wherein the inner microring further comprises a material selected from the group consisting of:
   a semiconductor doped with Mn, Cr, Ni, Fe, Co, alloys thereof, and terbium;
   other suitable rare earth ions;
   other suitable 3d ions with unfilled d-shells;
   terbium doped borosilicate glass; and
   terbium gallium garnet crystal.

6. The photonic switch of claim 4 wherein the magnetized outer layer further comprises a material selected from the group consisting of:
   iron;
   nickel;
   permalloy; and
   another suitable ferromagnetic material.

7. The photonic switch of claim 1 wherein the tunable microring resonator further comprises:
   an inner microring;
   an outer dielectric layer covering at least a portion of the outer surface of the inner microring;
   a ferromagnetic segment covering at least a portion of the outer surface of the outer dielectric layer; and
   an antiferromagnetic pinning stub covering at least a portion of the outer surface of the ferromagnetic segment.

8. The photonic switch of claim 7 wherein the inner microring further comprises an intrinsic semiconductor.

9. The photonic switch of claim 1 further comprises:
   a second tunable microring resonator disposed on the surface of the substrate adjacent to the first waveguide and the second waveguide and having an opening aligned with a second opening in the substrate; and
   a second wire that passes through the opening in the second microring and the second opening in the substrate.

10. The photonic switch of claim 1 wherein the second waveguide crossing the first waveguide further comprise the second waveguide disposed on the surface of the substrate and intersecting the first waveguide.

11. The photonic switch of claim 1 wherein the second waveguide crossing the first waveguide further comprise the second waveguide overlaying the first waveguide.

12. The photonic switch of claim 1 further comprises:
   a first wire electronically coupled to a first end of the wire; and
   a second wire electronically coupled to a second end of the wire.

13. A switch fabric comprising:
   a first set of approximately parallel waveguides disposed on a surface of a substrate;
   a second set of approximately parallel waveguides, each waveguide in the second set crossing each waveguide in the first set; and
   a set of photonic switches, wherein each photonic switch is disposed on the surface of a substrate adjacent to each crossing of a waveguide from the first set with a waveguide from the second set, and wherein each photonic switch includes a wire that passes through the photonic switch so that application of an appropriate current to the wire generates a magnetic field in the photonic switch that shifts resonance of the photonic switch to switch electromagnetic radiation between the first and second waveguides.

14. The photonic switch of claim 13 wherein each waveguide in the second set crossing each waveguide in the first set further comprise each waveguide in the second disposed on the surface of the substrate and intersecting each waveguide in the first set.

15. The photonic switch of claim 13 wherein each waveguide in the second set crossing each waveguide in the first set further comprise each waveguide in the second overlaying each waveguide in the first set.

16. The switch fabric of claim 13 wherein each photonic switch in the set of photonic switches further comprises:
   a first tunable microring resonator disposed on the surface of the substrate adjacent to a waveguide from the first set and adjacent to a waveguide from the second set and includes an opening aligned with a first opening in the substrate; and
   the wire passes through the opening in the first microring and the first opening in the substrate, wherein the appropriate current applied to the wire generates a magnetic field in the first microring, the magnetic field shifting resonance of the first microring to switch electromagnetic radiation between the first and second waveguides.

17. The switch fabric of claim 16 wherein the first tunable microring resonator further comprises:
   an inner microring; and
   a magnetized outer layer.

18. The switch fabric of claim 13 wherein the first tunable microring resonator further comprises:
   an inner microring;
   an outer dielectric layer covering at least of portion of the outer surface of the inner microring; and
   a magnetized segment covering at least a portion of the outer surface of the outer dielectric layer.

19. The switch fabric of claim 13 further comprises:
   a second tunable microring resonator disposed on the surface of the substrate adjacent to a waveguide from the first set and adjacent to a waveguide from the second set and includes an opening aligned with a second opening in the substrate; and
   a second wire that passes through the opening in the second microring and the second opening, wherein the appropriate current applied to the second wire generates a magnetic field in the second microring, the magnetic field shifts resonance of the second microring to switch electromagnetic radiation between the first and second waveguides.

20. The switch fabric 13 further comprises:
   a first set of wires, each wire of the first set of wires electronically coupled to at least one of the photonic switches; and
   a second set of wires, each wire of the second set of wires electronically coupled to at least one of the photonic switches.

* * * * *